(12) United States Patent
Manasek et al.

(10) Patent No.: US 8,202,476 B2
(45) Date of Patent: Jun. 19, 2012

(54) HEAT EXCHANGER SYSTEM USED IN STEEL MAKING

(75) Inventors: Richard J. Manasek, Greenwood, IN (US); David P. Kincheloe, Greenwood, IN (US)

(73) Assignee: AmeriFab, Inc., Indianapolis, IN (US)

( * ) Notice: Subject to any disclaimer, the term of this patent is extended or adjusted under 35 U.S.C. 154(b) by 14 days.

(21) Appl. No.: 11/877,185

(22) Filed: Oct. 23, 2007

(65) Prior Publication Data

US 2008/0035320 A1 Feb. 14, 2008

Related U.S. Application Data

(60) Division of application No. 10/828,044, filed on Apr. 20, 2004, now abandoned, which is a continuation-in-part of application No. 10/238,971, filed on Sep. 11, 2002, now Pat. No. 6,890,479.

(60) Provisional application No. 60/323,265, filed on Sep. 19, 2001.

(51) Int. Cl.
  *C21B 3/00* (2006.01)
(52) U.S. Cl. .......................................... 266/241; 373/74
(58) Field of Classification Search .................. 266/241; 373/74, 76
  See application file for complete search history.

(56) References Cited

U.S. PATENT DOCUMENTS

| | | | |
|---|---|---|---|
| 2,093,380 A * | 9/1937 | Morris | ........................... 420/489 |
| 2,829,972 A | 4/1958 | Klement | |
| 3,725,056 A | 4/1973 | Ingerson | |
| 3,849,587 A | 11/1974 | Hatch et al. | |
| 4,033,561 A | 7/1977 | Dhelft | |
| 4,192,258 A | 3/1980 | Touze | |
| 4,207,060 A | 6/1980 | Zangs | |
| 4,273,074 A | 6/1981 | Kuhlmann | |
| 4,637,034 A | 1/1987 | Grageda | |
| 4,715,042 A * | 12/1987 | Heggart et al. | .................. 373/74 |
| 4,830,825 A * | 5/1989 | Goto et al. | ................... 420/486 |
| 5,110,035 A * | 5/1992 | Reynolds et al. | ............. 228/183 |
| 5,241,559 A | 8/1993 | Hixenbaugh | |
| 6,059,028 A * | 5/2000 | Kincheloe et al. | ............ 165/297 |
| 6,330,269 B1 | 12/2001 | Manasek et al. | |
| 6,563,855 B1 | 5/2003 | Nishi et al. | |
| 6,890,479 B2 | 5/2005 | Manasek et al. | |

FOREIGN PATENT DOCUMENTS

| | | |
|---|---|---|
| DE | 299 04 559 | 6/1999 |
| EP | 0 905 466 | 3/1999 |
| EP | 01 909 161.0-2122 | 12/2004 |
| EP | 01 909 161.0-2122 | 9/2005 |
| FR | 75 39662 | 12/1975 |

(Continued)

OTHER PUBLICATIONS

The Riverside Publishing Company; New Riverside University Dictionary; Copyright 1984, 1988, 1994; Cover, Inside Cover, pp. 703 and 969.

(Continued)

*Primary Examiner* — Scott Kastler
(74) *Attorney, Agent, or Firm* — Barnes & Thornburg

(57) ABSTRACT

A heat exchanger system is disclosed. The heat exchanger system may be comprised of a front plate and a base plate, wherein piping is fitted with spray nozzles that direct a spray of the cooling fluid on a backside of the front plate. The front plate is preferably fabricated out of aluminum bronze alloy.

13 Claims, 10 Drawing Sheets

FOREIGN PATENT DOCUMENTS

| | | |
|---|---|---|
| GB | 1064506 | 9/1965 |
| GB | 1088827 | 9/1965 |
| GB | 1 365 514 | 9/1974 |
| GB | 2 377 008 | 12/2002 |
| WO | WO 01/63193 | 8/2001 |

OTHER PUBLICATIONS

Complaint for Patent Infringement, dated Aug. 13, 2004.
Answer and Counterclaims, dated Nov. 29, 2004.
Plaintiff's Reply to Defendant's Counterclaim, dated Dec. 3, 2004.
Declaration of J. V. Guy-Bray, dated Dec. 13, 2004.
Amended Complaint for Patent Infringement, dated Mar. 11, 2005.
Jonathan Midgley of Marks & Clerk; Fax regarding letter and amended pp. 2, 4, 5 and 11 to 13—European Patent Application 01909161.0; Mar. 21, 2005.
Answer to Amended Complaint and Counterclaims, dated Mar. 23, 2005.
Joint Motion for Entry of Stipulated Protective Order, dated Mar. 28, 2005.
Stipulated Protective Order, dated Mar. 30, 2005.
Order on Claim Construction, dated Jul. 29, 2005.
Motion and Answer for Leave to Amend Affirmative Defenses and Counterclaims, dated Aug. 3, 2005.
Answer to Amended Complaint with Amended Affirmative Defenses and Counterclaims, dated Sep. 2, 2005.
Declaration of R. Eric Gaum, dated Sep. 13, 2005.
Plaintiff's Reply to Defendant's Amended Counterclaims, dated Sep. 22, 2005.
Order on Motions for Summary Judgment, dated May 10, 2006.
Defendant's Motion for Partial Reconsideration and/or Clarification of the Court's Summary Judgment Ruling on Patent Invalidity, dated May 26, 2006.
Order on Defendant's Motion for Partial Reconsideration and/or Clarification of the Court's Summary Judgment Rule on Patent Invalidity, dated Jun. 2, 2006.
Stipulated Notice of Dismissal, dated Jan. 11, 2007.
Stipulated Notice of Dismissal Is Granted, dated Jan. 12, 2007.
Metals Handbook, 8th Edition, vol. 1—Properties and Selection of Metals, published by American Society for Metals—pp. 960-990, p. 1002, pp. 1033-1037.
European Search Report for European Patent Application No. 06 850 091.7, dated Sep. 8, 2001.
International Search Report for International Application No. PCT/US06/60461, dated Jul. 28, 2008.
International Search Report for International Application No. PCT/US05/07536, dated Aug. 9, 2006.

* cited by examiner

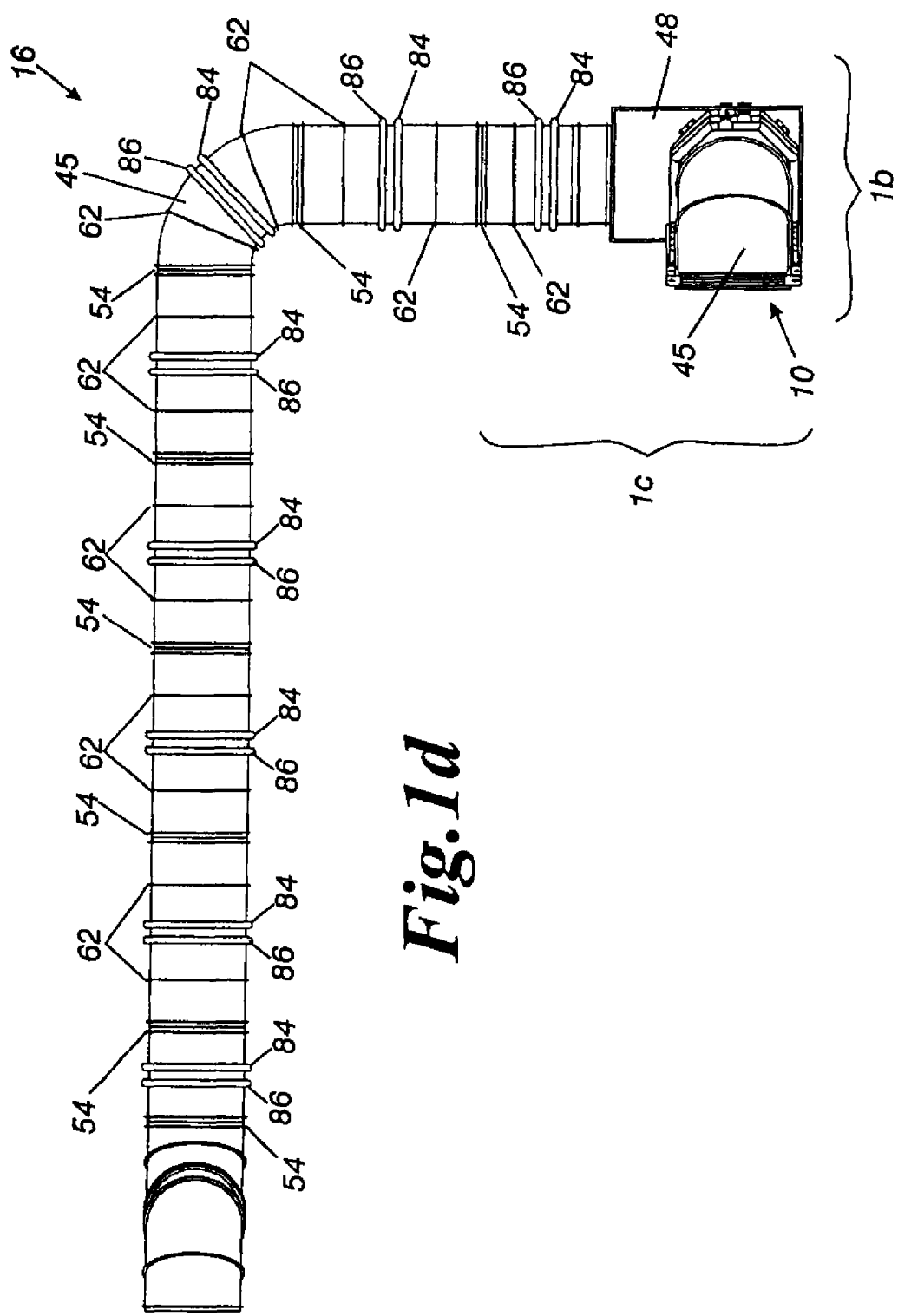

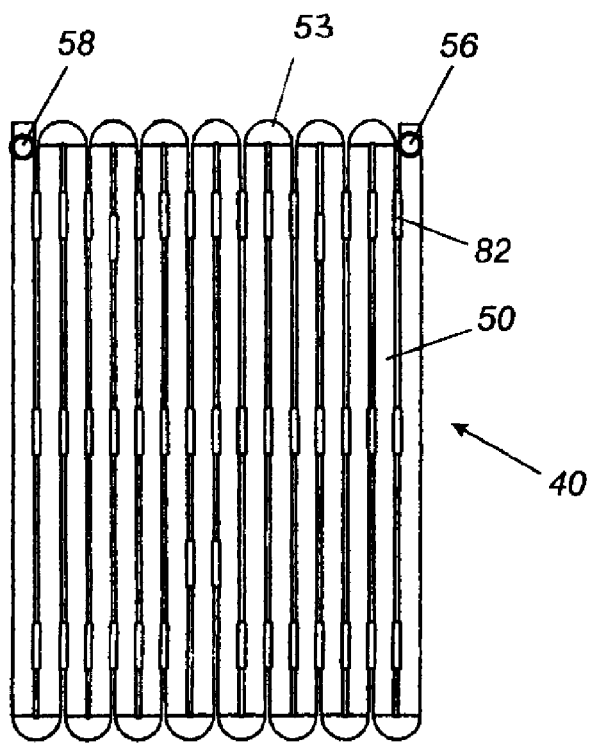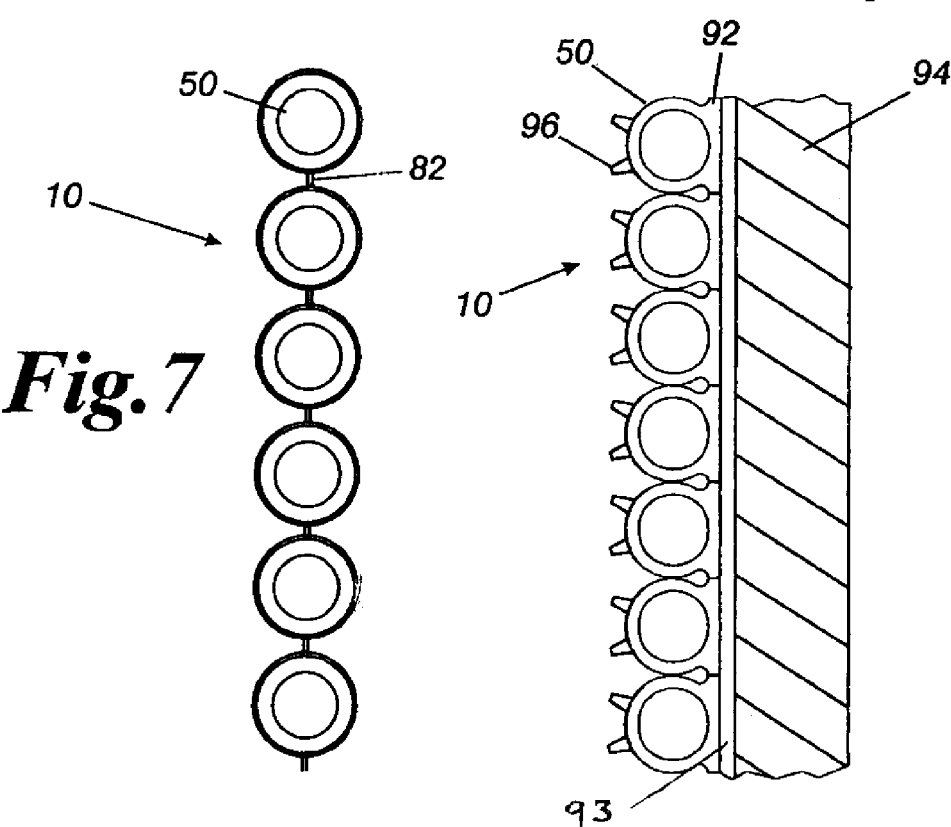

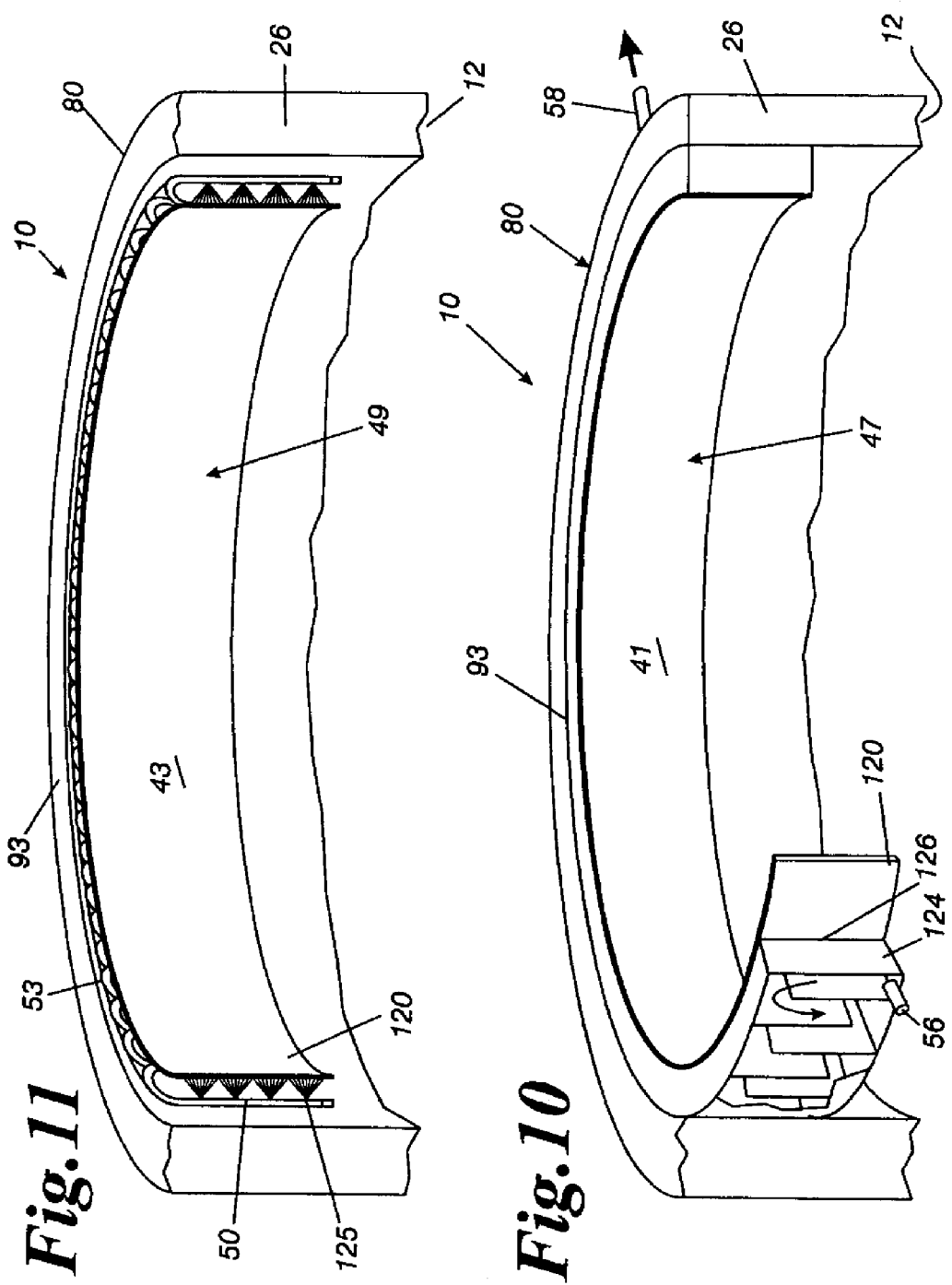

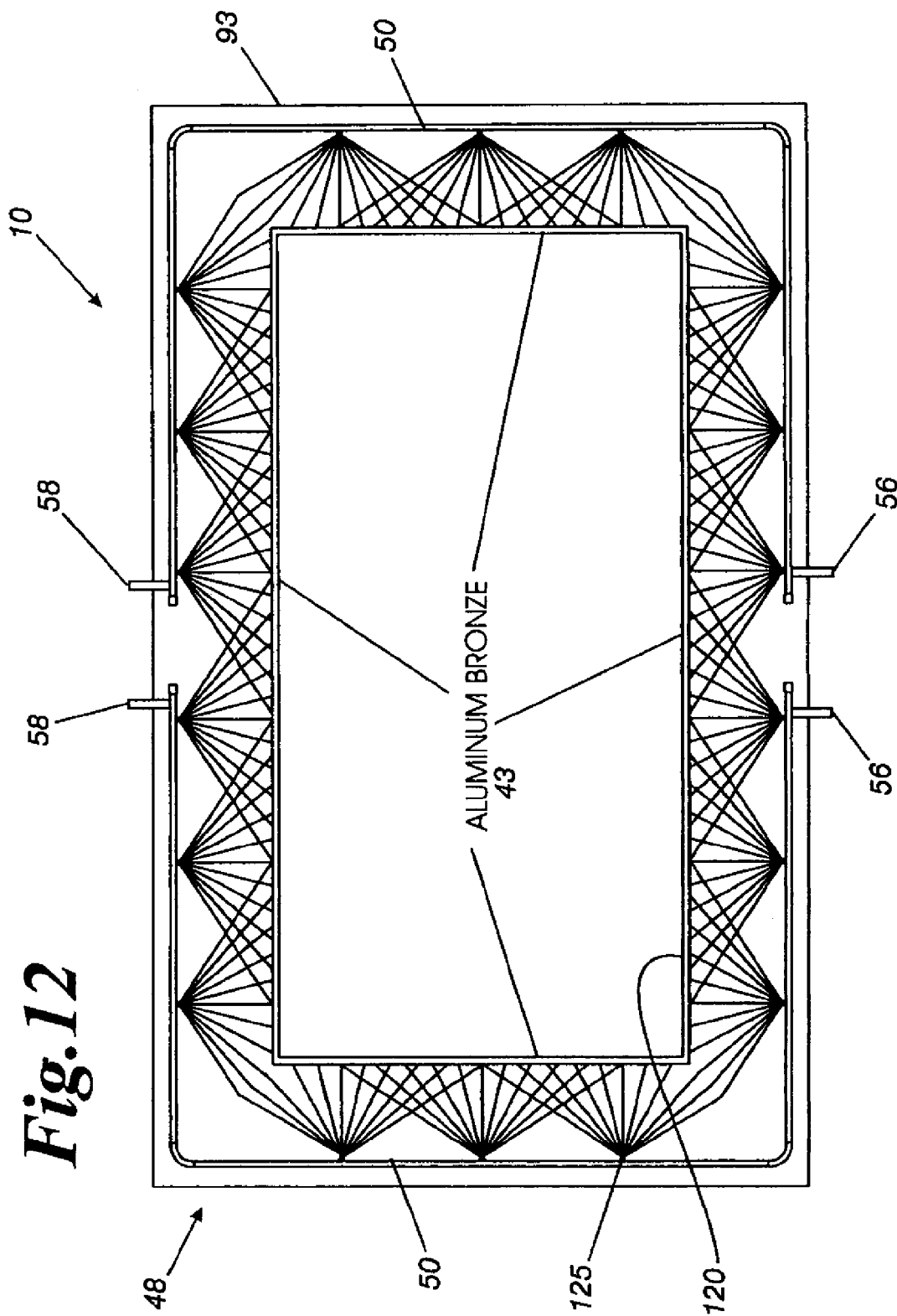

HEAT EXCHANGER SYSTEM USED IN STEEL MAKING

CROSS REFERENCE TO RELATED APPLICATIONS

This application is a divisional of U.S. patent application Ser. No. 10/828,044 filed on Apr. 20, 2004 now abandoned, entitled "Heat Exchanger System Used in Steel Making" which is a continuation-in-part of U.S. patent application Ser. No. 10/238,971 filed on Sep. 11, 2002 (now U.S. Pat. No. 6,890,479), which claims the benefit of U.S. Provisional Application No. 60/323,265, filed Sep. 19, 2001. The entireties of which are expressly incorporated by reference herein.

FIELD OF THE INVENTION

The present invention relates to apparatus for metallurgical processing, particularly steel and iron making. More particularly, the invention relates to a heat exchanger system used in a metallurgical furnace and its support components, wherein the heat exchanger system comprise aluminum bronze alloy piping. The heat exchanger system includes piping mounted to the furnace wall, the furnace roof, and to the off-gas system, where the off-gas system comprises off-gas ducting and a smoke ring. The heat exchanger system provides cooling, and the aluminum bronze alloy piping extends the operational life of the furnace.

BACKGROUND OF THE INVENTION

Today, steel is made by melting and refining iron and steel scrap in a metallurgical furnace. Typically, the furnace is an electric arc furnace (EAF) or basic oxygen furnace (BOF). With respect to the EAF furnaces, the furnace is considered by those skilled in the art of steel production to be the single most critical apparatus in a steel mill or foundry. Consequently, it is of vital importance that each EAF remain operational for as long as possible.

Structural damage caused during the charging process affects the operation of an EAF. Since scrap has a lower effective density than molten steel, the EAF must have sufficient volume to accommodate the scrap and still produce the desired amount of steel. As the scrap melts it forms a hot metal bath in the hearth or smelting area in the lower portion of the furnace. As the volume of steel in the furnace is reduced, however, the free volume in the EAF increases. The portion of the furnace above the hearth or smelting area must be protected against the high internal temperatures of the furnace. The vessel wall, cover or roof, duct work, and off-gas chamber are particularly at risk from massive thermal, chemical, and mechanical stresses caused by charging and melting the scrap and refining the resulting steel. Such stresses greatly limit the operational life of the furnace.

Historically, the EAF was generally designed and fabricated as a welded steel structure which was protected against the high temperatures of the furnace by a refractory lining. In the late 1970's and early 1980's, the steel industry began to combat operational stresses by replacing expensive refractory brick with water cooled roof panels, and water cooled sidewall panels located in portions of the furnace vessel above the smelting area. Water cooled components have also been used to line furnace duct work in the off-gas systems. Existing water cooled components are made with various grades and types of plates and pipes. An example of a cooling system is disclosed in U.S. Pat. No. 4,207,060 which uses a series of cooling coils. Generally, the coils are formed from adjacent pipe sections with a curved end cap, which forms a path for a liquid coolant flowing through the coils. This coolant is forced through the pipes under pressure to maximize heat transfer. Current art uses carbon steel and stainless steel to form the plates and pipes.

In addition, today's modern EAF furnaces require pollution control to capture the off-gases that are created during the process of making steel. Fumes from the furnace are generally captured in two ways. Both of these processes are employed during the operation of the furnace. One form of capturing the off-gases is through a furnace canopy. The canopy is similar to an oven hood. It is part of the building and catches gases during charging and tapping. The canopy also catches fugitive emissions that may occur during the melting process. Typically, the canopy is connected to a bag house through a non-water cooled duct. The bag house is comprised of filter bags and several fans that push or pull air and off-gases through the filter bags to cleanse the air and gas of any pollutants.

The second manner of capturing the off-gas emissions is through the primary furnace line. During the melting cycle of the furnace, a damper closes the duct to the canopy and opens a duct in the primary line. This is a direct connection to the furnace and is the main method of capturing the emissions of the furnace. The primary line is also used to control the pressure of the furnace. This line is made up of water cooled duct work as temperatures can reach 4,000° F. and then drop to ambient in a few seconds. The gas streams generally include various chemical elements, including hydrochloric and sulfuric acids. There are also many solids and sand type particles. The velocity of the gas stream can be upwards of 150 ft./sec. These gases will be directed to the main bag house for cleansing, as hereinabove described.

The above-described environments place a high level of strain on the water cooled components of the primary ducts of the EAF furnace. The variable temperature ranges cause expansion and contraction issues in the components which lead to material failure. Moreover, the dust particles continuously erode the surface of the pipe in a manner similar to sand blasting. Acids flowing through the system also increase the attack on the material, additionally decreasing the overall lifespan.

Concerning BOF systems, improvements in BOF refractories and steelmaking methods have extended operational life. However, the operational life is limited by, and related to, the durability of the off-gas system components, particularly the duct work of the off-gas system. With respect to this system, when failure occurs, the system must be shut down for repair to prevent the release of gas and fumes into the atmosphere. Current failure rates cause an average furnace shut down of 14 days. As with EAF type furnaces, components have historically been comprised of water cooled carbon steel, or stainless steel type panels.

Using water cooled components in either EAF or BOF type furnaces has reduced refractory costs, and has also enabled steelmakers to operate each furnace for a greater number of heats than was possible without such components. Furthermore, water cooled equipment has enabled the furnaces to operate at increased levels of power. Consequently, production has increased and furnace availability has become increasingly important. Notwithstanding the benefits of water cooled components, these components have consistent problems with wear, corrosion, erosion, and other damage. Another problem associated with furnaces is that as available scrap to the furnace has been reduced in quality, more acidic gases are created. This is generally the result of a higher concentration of plastics in the scrap. These acidic gases must be evacuated from the furnace to a gas cleaning system so that they may be released into the atmosphere. These gases are directed to the off-gas chamber, or gas cleaning system, by a plurality of fume ducts containing water cooled pipes. However, over time, the water cooled components and the fume ducts give way to acid attack, metal fatigue, or erosion. Certain materials (i.e., carbon steel and stainless steel) have been utilized in an attempt to resolve the issue of the acid attack. More water and higher water temperatures have been used with carbon steel in an attempt to reduce water concentration in the scrap, and reduce the risk of acidic dust sticking to the side walls of a furnace. The use of such carbon steel in this manner has proven to be ineffective.

Stainless steel has also been tried in various grades. While stainless steel is less prone to acidic attack, it does not possess the heat transfer characteristics of carbon steel. The results obtained were an elevated off-gas temperature, and built up mechanical stresses that caused certain parts to fracture and break apart.

Critical breakdowns of one or more of the components commonly occurs in existing systems due to the problems set forth above. When such a breakdown occurs, the furnace must be taken out of production for unscheduled maintenance to repair the damaged water cooled components. Since molten steel is not being produced by the steel mill during downtime, opportunity losses of as much as five thousand dollars per minute for the production of certain types of steel can occur. In addition to decreased production, unscheduled interruptions significantly increase operating and maintenance expenses.

In addition to the water cooled components, corrosion and erosion is becoming a serious problem with the fume ducts and off gas systems of both EAF and BOF systems. Damage to these areas of the furnace results in loss of productivity and additional maintenance costs for mill operators. Further, water leaks increase the humidity in the off-gases, and reduce the efficiency of the bag house as the bags become wet and clogged. The accelerated erosion of these areas used to discharge furnace off-gases is due to elevated temperatures and gas velocities caused by increased energy in the furnace. The higher gas velocities are due to greater efforts to evacuate all of the fumes for compliance with air emissions regulations. The corrosion of the fume ducts is due to acid formulation/attack on the inside of the duct caused by the meetings of various materials in the furnaces. The prior art currently teaches of the use of fume duct equipment and other components made of carbon steel or stainless steel. For the same reasons as stated above, these materials have proven to provide unsatisfactory and inefficient results.

A need, therefore, exists for an improved water cooled furnace panel system and method for making steel. Specifically, a need exists for an improved method and system wherein water cooled components and fume ducts remain operable longer than existing comparable components.

SUMMARY OF THE INVENTION

The present invention is a heat exchanger system suitable for iron making furnaces and their supporting exhaust and cooling system. The heat exchanger has at least one panel of sinuously winding piping having an inlet and an outlet, an input manifold in fluid communication with the inlet of the at least one panel, an output manifold in fluid communication with the outlet of the panel, a cooling fluid flowing through the piping, and a stream of hot exhaust gases flowing over the piping. In this disclosure, the terms tubing, pipes, and piping are synonymous, and used interchangeably. The sinuously winding piping is substantially an assemblage of sectional lengths of connected tubes or pipes mounted side-by-side. The connected tubes are secured to each other with a linkage thereby forming a solid panel, where the panel has structural integrity. The linkages add rigidity to the system, and establish the overall planarity and partially, or all of, the curvature of the panel. For instance, by adjusting the side-by-side relationship of the connected tubes, such that they are slightly displaced several degrees from zero, the cumulative effect produces a solid panel that has curvature, instead of being flat. In most applications, the heat exchanger system has at least one panel mounted to an interior side of a wall, where the panel is in fluid communication with the output and the input manifolds that are on an exterior side of the wall. The wall typically is a wall of a steel making furnace, a furnace roof, a smoke ring exhaust port, a straight section of an exhaust duct, and a curved section of an exhaust duct. In many of the identified applications, the wall is curved. For instance, a furnace exhaust duct is typically ellipsoidal or round, depending on the design parameters. The interior side of the exhaust duct wall can have one or a plurality of panels, where the panels have a curvature that is comparable to the curvature of the duct. The plurality of panels is each individually supplied cooling liquid from the output manifold, which encircles the exterior side of the exhaust duct. The plurality of panels returns the cooling liquid to the output manifold, which encircles the exterior side of the exhaust duct.

The heat exchanger system can be used to collect and cool slag formed on the furnace wall. The heat exchanger reduces the formation of stress risers. Preferably, the tubes have at least one spline that is an elongate ridge. The tubes are preferably fabricated into panels where the tubes have an orientation that is substantially horizontal with the molten material in the furnace. Typically; the furnace walls are curved, and the tubes are also curved so as to follow the curvature of the furnace wall (a.k.a., shell). One tube can track around the entire inside circumference of the furnace wall, however, a more effective, uniform temperature configuration is to break the circumference down into arcs, and utilize sectional lengths of piping that are serially connected with adjacent connected tubes. An assemblage of sectional lengths of connected tubes mounted side-by-side forms a panel. The plurality of panels are individually supplied cooling liquid from the output manifold, which is on the exterior side of the furnace wall. The plurality of panels returns the cooling liquid to the output manifold, which is on the exterior side of the furnace wall. In a modified version, the heat exchanger system can have more than one inlet, and more than one outlet within the assemblage of connected tubes, where the assemblage is curved to follow the contour of the interior side of the furnace wall. The assemblage can be configured such that a first assemblage of connected pipes loops inside a second assemblage of connected pipes.

The heat exchanger system can be further comprised of a base plate to which the sinuously winding piping is attached. Air flow over and around the piping of this system is not as complete as one where the piping is secured merely by linkages, however, great shear strength can be achieved, and this system is particularly suitable where air borne or splashed solids (slag) will collect, or where there is a lot of vibration. The employment of a base plate is well suited for applications where the heat exchanger system is used to collect slag.

The heat exchanger system can be further comprised of a front plate as well as the base plate, wherein the sinuously winding piping is sandwiched between the base plate and the front plate. The front plate is preferably fabricated out of aluminum bronze alloys, where the aluminum bronze alloy is selected for its high coefficient of thermal conductivity, especially at the higher operating temperatures. The utilization of two plates enables the sinuously winding piping to be replaced with baffles or weirs, which act to direct the cooling fluid to flow in a manner similar to the pipes. The fluid winds sinuously through a channel defined by the baffles between the front plate and the base plate. The baffles are substantially perpendicular elongate plates. In a preferred construction, a longitudinal edge of the baffle is welded to a backside of the front plate, and the base plate is attached to an opposing longitudinal edge of the baffle. As previously enumerated, the combination of plates and baffles affects a sinuously winding channel, where the channel is substantially comparable to a fabricated tube. A front side of the front plate is exposed to the hot exhaust gases.

The heat exchanger system can alternatively be comprised of a front plate and a base plate, wherein piping is fitted with spray nozzles that direct a spray of the cooling fluid on a backside of the front plate. The front plate is preferably fabricated out of aluminum bronze alloy, where the aluminum bronze alloy is selected for its resistance to oxidation as well as its high coefficient of thermal conductivity. The base plate serves principally as a mounting platform for the pipes fitted with nozzles. The front plate is offset from the nozzles, which are directed toward the backside of the front plate. The front side of the aluminum bronze plate is exposed to the heat, and the spray is collected and returned via the output manifolds. The input manifolds provide the pressurized cooling fluid. The cooling fluid is preferably water because of it low cost and high heat capacity. The nozzles disperse the cooling fluid as a spray pattern and less piping is required, thereby reducing the need that the pipes be sinuously winding. The heat exchanger system using nozzles is configured such that drainage is always toward the bottom of the panel so as to prevent a buildup of cooling fluid from obstructing the nozzles.

The heat exchanger system is configured such that cumulatively, the total number of panels is sufficient to cover an area that cools the exhaust gases to a desired temperature. In the case of exhaust gases from an electric arc furnace the exit temperature of the gases is around 4,000° F.-5,000° F. Theses gases are filtered at a bag house to remove vaporized metals, such as zinc, and certain volatile ashes. Bag houses operate at about 200° F.-350° F. and, therefore, incoming exhaust gases must be cooled accordingly. The panels are fabricated to be curved or planar, thereby producing the needed surface area for a given cooling requirement.

It is anticipated that the present heat exchanger system can be used in combination with other heat transfer equipment, such as condensers, shell and tube-type exchangers, finned exchangers, plate-and-frame-heat exchangers, and forced-draft air-cooled exchangers.

It is further anticipated that the heat exchanger has other applications, such as cooling exhaust gases from converting plants, paper manufacturing plants, coal and gas fired electrical power generation plants, and other exhaust gas generators, where the gases are cooled for the purpose of capturing one or more components of the gas, where capture is effected by condensation, by carbon bed absorption, or by filtration. The heat exchanger system is preferably fabricated using an aluminum bronze alloy. Aluminum bronze alloys have been found to have a higher than expected thermal conductivity, resistance to etching by the stream of hot gases (modulus of elasticity}, and good resistance to oxidation. Thus, the operational life of the heat exchanger is extended. Corrosion and erosion of the heat exchanger and related components is reduced, when they are fabricated with aluminum bronze.

OBJECTS OF THE INVENTION

A first object of the present invention is to provide a heat exchanger system constructed of aluminum bronze alloys, where aluminum bronze alloys have been found to have a higher than expected thermal conductivity, resistance to etching by the stream of hot gases, and good resistance to oxidation.

A second object of the present invention is to provide a heat exchanger system wherein the operational life of the heat exchanger is extended, as corrosion and erosion of the heat exchanger and related components is reduced when they are fabricated with aluminum bronze alloy.

A third object of the present invention is to provide a heat exchanger system, wherein the system is adaptable for cooling exhaust gases emanating from a steel making furnace, wherein the heat exchanger system can be fitted to the walls of the furnace, a furnace roof, a smoke ring exhaust port, a straight section of an exhaust duct, and a curved section of an exhaust duct. It is further anticipated that the heat exchanger has other applications, such as cooling exhaust gases from converting plants, paper manufacturing plants, coal and gas fired electrical power generation plants, and other exhaust gas generators, where the gases are cooled for the purpose of capturing one or more components of the gas, where capture is effected by condensation, by carbon bed absorption, or by filtration.

A fourth object of the invention is to provide a heat exchanger system that can be strung together in essentially similar units to cool the exhaust gases exiting a metallurgical furnace, such as EAF or BOF from 4,000° F.-5,000° F. to 200° F.-350° F.

A fifth object of the invention is to provide an improved heat exchanger system that is for collecting and cooling slag, where the sinuously winding piping is extruded seamless piping having an elongate ridge, where the piping better resists corrosion, erosion, pressure, and thermal stress.

BRIEF DESCRIPTION OF THE DRAWINGS

The foregoing and other objects will become more readily apparent by referring to the following detailed description and the appended drawings in which:

FIG. 1d is an offset elevational view of a series of cooling exhaust ducts. The series of cooling exhaust ducts are connected to the off-gas chamber, and the elbow exhaust duct that is connected to a roof of the furnace. The series provides both cooling and ducting of the hot fume gases and dust being drawn off the furnace.

FIG. 5 is a side view of a panel of sinuously winding piping with an inlet and an outlet. The piping is spaced and linked with brazed linkages.

FIG. 6 is a cross-sectional view of the sinuously winding piping, wherein the piping has splines and a base. The base is attached to a base plate that is attached to an interior side of a wall.

FIG. 7 is a cross-sectional view of the sinuously winding piping, illustrating how the pipes are spaced and linked with connecting linkages.

FIG. 10 is a partially cutaway cross-sectional side view of a heat exchanger system that utilizes baffles, where the heat exchanger is fitted on the wall of a steel making furnace. The heat exchanger has an aluminum bronze front plate, baffles, and base plate. The front plate is directly exposed to the heat, exhaust gases, and slag produced by the furnace.

FIG. 11 is a cross-sectional view of a heat exchanger system that utilizes spray nozzles, where the heat exchanger is fitted on the wall of a steel making furnace. The heat exchanger has an aluminum bronze front plate, pipes fitted with nozzles, and base plate. The front plate is directly exposed to the heat, exhaust gases and slag produced by the steel making process. The nozzles spray the cooling fluid from the base plate toward the backside of the front plate. The front plate is displaced sufficiently from the nozzles that the cooling fluid is dispersed over a wider area.

FIG. 12 is a cross-sectional view of a heat exchanger system that utilizes spray nozzles, where the heat exchanger is an air box. The aluminum bronze front plate is on the interior of the air box, and pipes, fitted with nozzles, are mounted to the base plate. The nozzles spray the cooling fluid from pipes secured to the base plate toward the backside of the front plate. The front plate is displaced sufficiently from the nozzles that the cooling fluid is sprayed in an overlapping pattern. The overlap is sufficient to cover an area. Note, there are two inlets and two outlets.

DESCRIPTION OF THE ILLUSTRATIVE EMBODIMENTS

Figure 1:
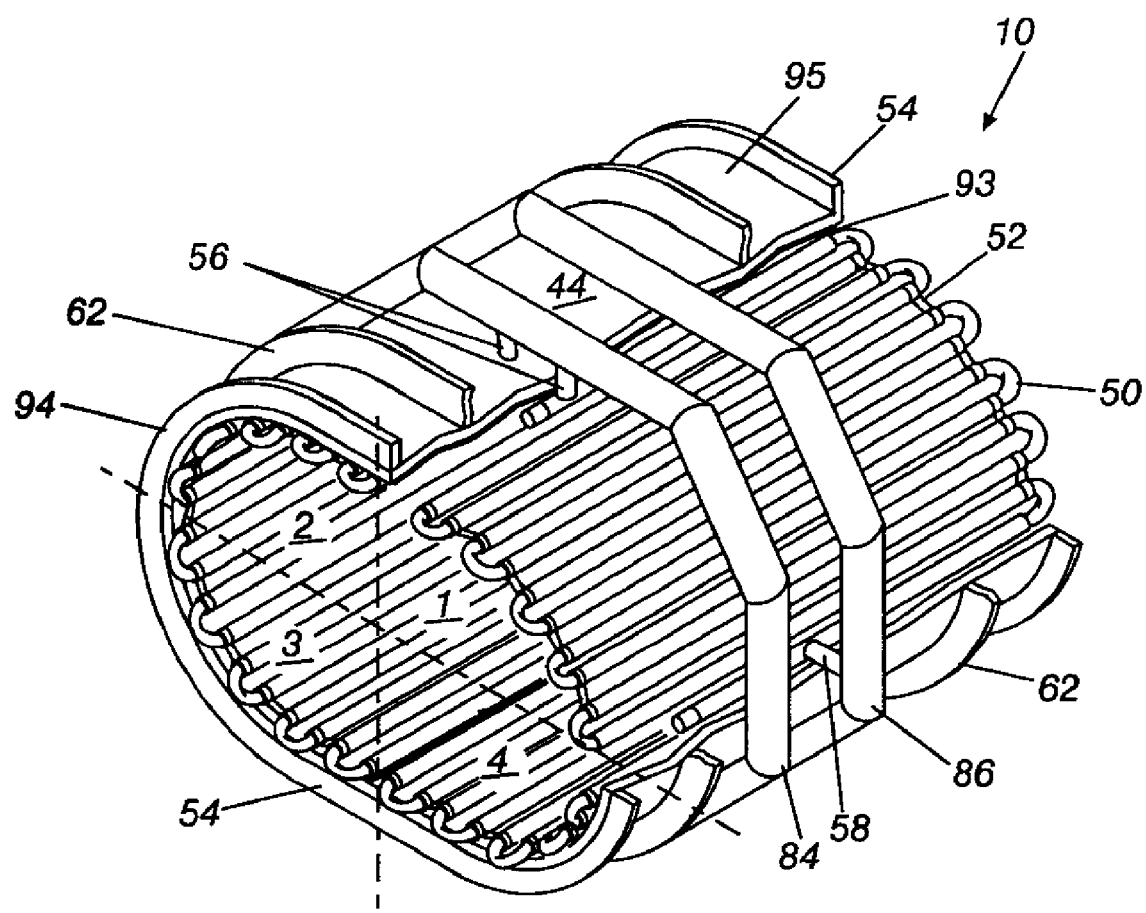
FIG. 1 is a partially cut away perspective view illustrating the invention. The heat exchanger system has at least one panel of sinuously winding piping having an inlet and an outlet which are in fluid communication with a pair of manifolds. The illustrated panels are mounted on the inside of an exhaust duct.
Figure 1A:
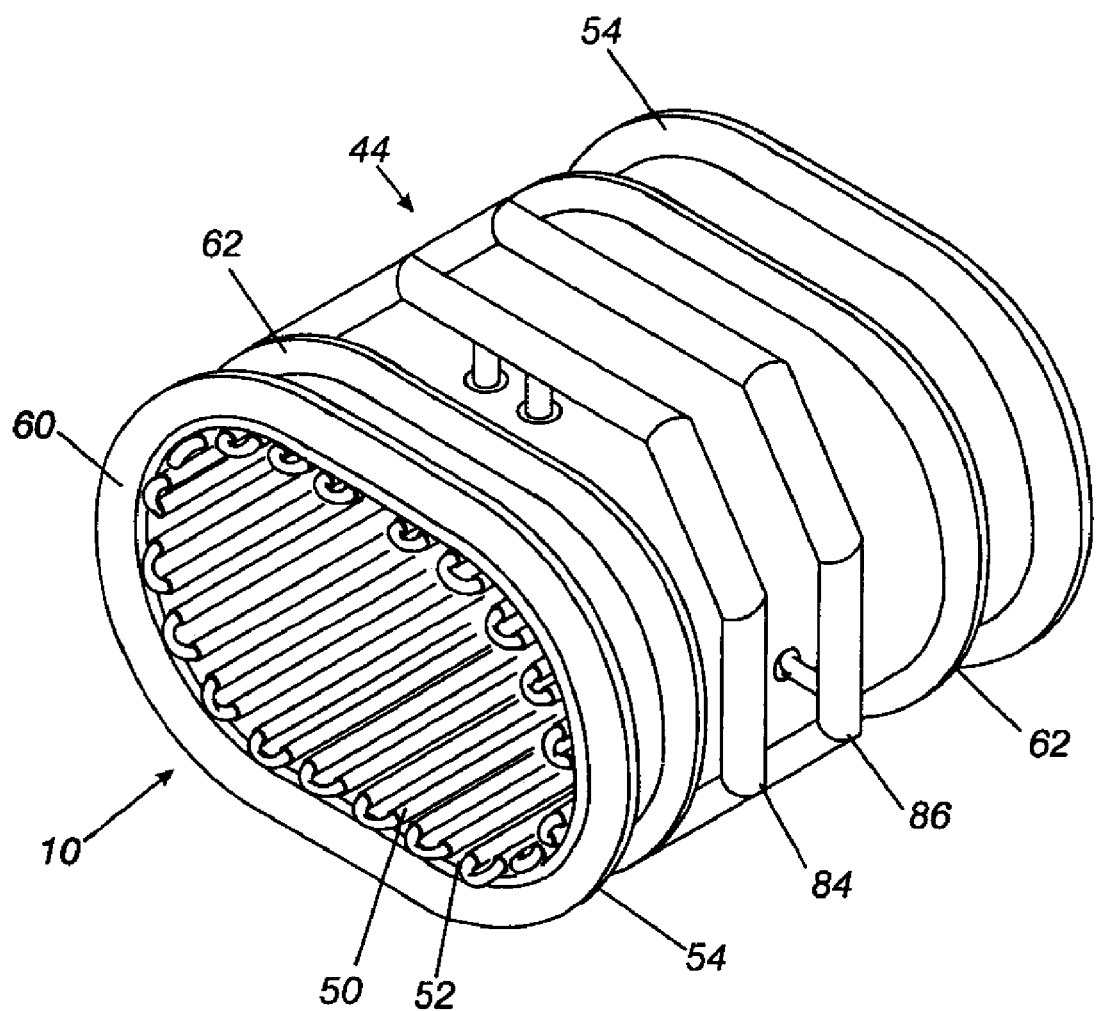
FIG. 1a is a perspective view of the invention illustrated in FIG. 1. The exhaust duct is fitted with the heat exchanger system. The duct is used in the steel making industry to convey and cool exhaust gases pulled from the steel making furnace. The sinuously winding piping, which is partially shown in ghost, is made of an aluminum bronze alloy. The duct can also be made of aluminum bronze alloy.

As required, detailed embodiments of the present invention are disclosed herein, however, it is to be understood that the disclosed embodiments are merely exemplary of the invention, which may be embodied in various forms. Therefore, specific structural and functional details disclosed herein are not to be interpreted as limiting.

The heat exchanger system 10 comprises at least one panel of sinuously winding piping 50 having an inlet 56 and an outlet 58, an input manifold 84 in fluid communication with the inlet of the at least one panel, an output manifold 86 in fluid communication with the outlet of the at least one panel, and a cooling fluid flowing through the piping. The heat exchanger system 10 cools hot fume gases 36 and dust that is being evacuated from a metallurgical furnace 80 and its supporting components. The piping is an assemblage of sectional lengths of connected tubes mounted side-by side, wherein the connected tubes are secured to each other with a linkage 82, therein forming the at least one panel 54. The inventors have empirically determined that a preferred composition for fabricating the piping 50 is an aluminum bronze alloy. Aluminum bronze alloys have been found to have a higher than expected thermal conductivity, resistance to etching by the stream of hot gases (modulus of elasticity), and good resistance to oxidation. Thus, the operational life of the heat exchanger is extended. Corrosion and erosion of the heat exchanger and related components is reduced, when they are fabricated with aluminum bronze. Table 1 compares the thermal conductivity of aluminum bronze, P22 (Fe~96%, C~0.1%, Mn~0.45%, Cr~2.65%, Mo~0.93%) and carbon steel (A 106B). Aluminum bronze has thermal conductivity that is 41% higher than P22 and 30.4% than carbon steel. The heat exchangers fabricated using aluminum bronze and alloys thereof are more efficient, and have a longer operational life than furnace constructed of refractory materials and or other metal alloys.

TABLE 1

| Property | Aluminum Bronze | P22 | A106B |
|---|---|---|---|
| Hardness (HRB) | 149 | 110 | 106 |
| Tensile Strength (KSI) | 78 | 60 | 60 |
| Elongation (% in 2") | 42 | 20 | 19 |
| Yield Strength (KSI) | 35 | 30 | 35 |
| Thermal Conductivity {W/mK) | 32.6 | 23 | 25 |

It has also been determined that the piping is preferably extruded, where the piping resists corrosion, erosion, pressure, and thermal stress. Performance is particularly enhanced where the piping has an elongate ridge that serves as a fin. The fin can serve to enhance cooling and collect slag. There are no weld lines that can fail, and the extruded seamless piping distributes heat more uniformly, which in turn improves the overall performance of the heat exchanger system. The piping can be curved or bent to match the curvature of a wall to which it is being attached, if so needed. More typically, the individual sections of piping are secured to each other with an angled linkage such that the resulting panel has a curvature that is comparable to the curvature of the wall.

The heat exchanger system as illustrated in the drawings employs manifolds and multiple panels to further enhance the cooling efficiency. The combination assures that cool water is flowing through all the piping, therein optimizing heat transfer. The sinuously winding piping optimizes the surface area. The piping is typically secured using linkages and spacers, which enable fume gases to flow essentially around nearly the entire perimeter of the piping.

Referring to FIG. 1, the present invention 10 is shown in a fumed exhaust gas duct 44 having a wall 94 with an interior side of the wall 93 and an exterior side of the wall 95. The wall 94 is partially cut away to view the interior of the duct 44. The illustrated duct 44 is elliptical, an engineering construction selected to increase the surface area versus a circular duct. The duct is divided into four quadrants, numbered 1-4, as indicated by the abscissas and the ordinate dashed lines. In the instant invention, the heat exchanger utilizes four panels of sinuously winding piping, each with one inlet 56, and one outlet 58. Each panel is assembled with linkages 52 that serve as spaces and fasteners to secure the pipes 50, and therein establishing the relative position of one sectional length of piping with respect to the adjacent sectional lengths of piping. The panels, 1-4, are mounted on the inside wall 93 of the duct 44. Each panel is in fluid communication with an input manifold 84, and an output manifold 86. The manifolds 84 and 86 are mounted to the exterior side 95 of the wall 94, and substantially encircle the duct 44. The piping 50 is oriented so as to be substantially collinear with the wall of the duct 44. The orientation is selected because it is easier to fabricate and creates less pressure drop over the length of the duct. Both ends of the duct 44 are terminated with a flange 54 that enables the cooling duct to be coupled to another duct. Each duct is substantially a self-contained modular cooling unit. The modularization enables duct fabrication to be to a certain extent generic. Each duct has a cooling capacity, and the ducts are combined in sufficient numbers to achieve the desired cooling. The modularization is in part due to the fact that the heat exchanger system is comprised of individually cooled panels having a known cooling capacity, that when combined determine the cooling capacity of the duct. The cumulative cooling capacity is ultimately, therefore, a function of the type, number, and configuration of the panels, and the temperature and flow rate of the cooling fluid provided by the manifolds. The panels are largely substantially self-contained, modular components that are also relatively generic. The fume exhaust duct 44 typically has a pair of mounting supports numbered 62 for attaching the duct to a frame or support.

Figure 1C:
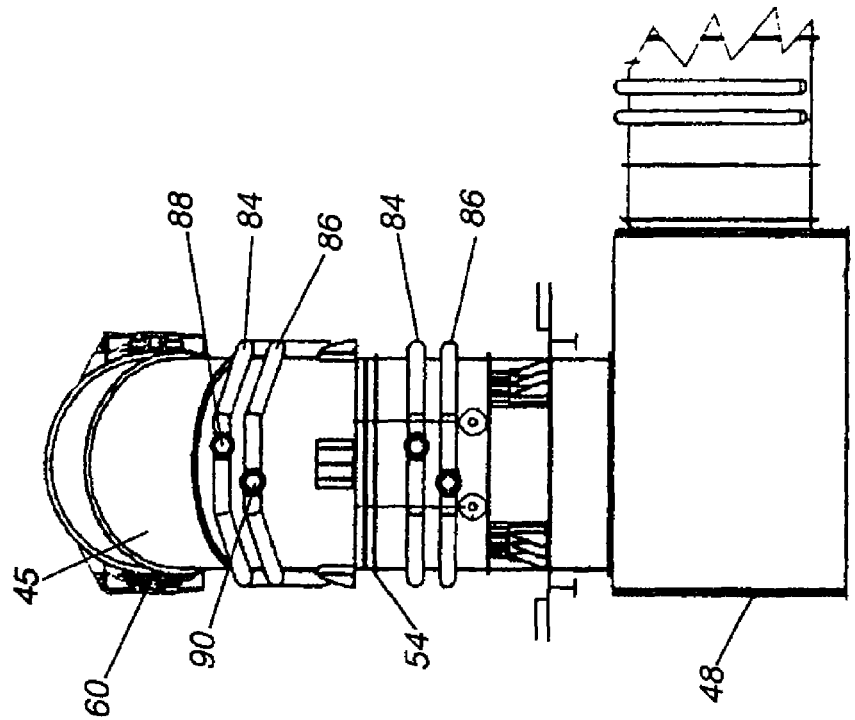
FIG. 1c is an elevational view of the ducts and the off-gas chamber illustrated in FIG. 1b.
Figure 1B:
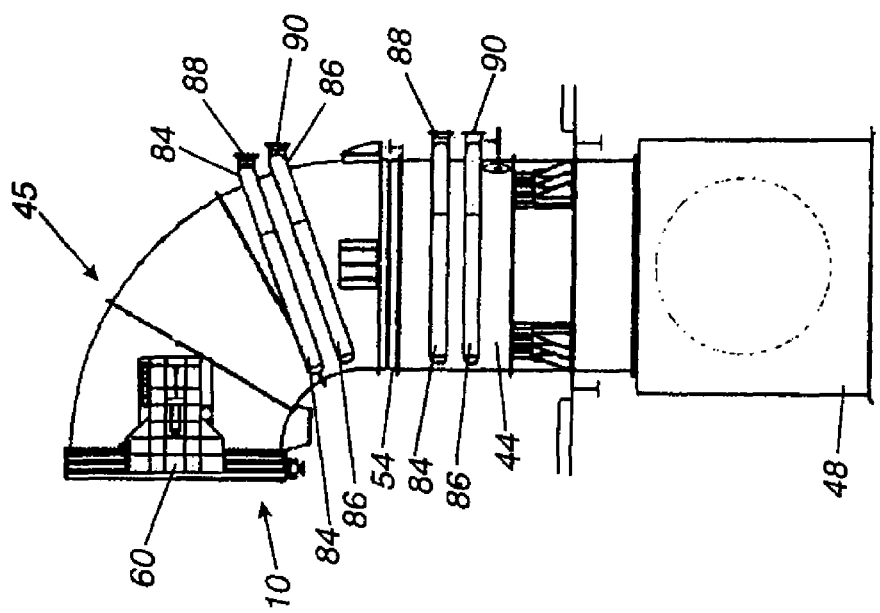
FIG. 1b is a side view of an elbow exhaust duct connected to a straight exhaust duct, which in turn is connected to an off-gas chamber.

The external elements of the duct and the heat exchanger system are illustrated in FIGS. 1*a*, 1*b*, 1*c*, and 1*d*. The duct 44 can be fitted with mounting brackets 60 for attaching the duct to the furnace roof, to an off-gas chamber (which is sometimes referred to as an air box 48), or to provide support to the flange 54. Referring to FIG. 1 *b*, the elbow duct 45 is connected to a straight exhaust duct 44, which in turn is connected to an off-gas chamber 48. The elbow shaped duct 45 has roof brackets 60 for securing the elbow 45 to a furnace roof. A smoke ring 66 protrudes from the entrance of the elbow duct 66. As can be seen in FIGS. 2-4 and FIG. 8, the smoke ring 66 is the heat exchanger 10 having a circular configuration. The elbow duct has an input manifold 84 and an output manifold 86. The input manifold 84 is connected to a source of cooling water at 88 and the output manifold 86 is connected to a recycle outlet 90. The elbow duct 45 and the straight duct 44 are coupled via their respective flanges 54. The straight duct 44 and the off-gas chamber 48 are coupled via their respective flanges 54. The off-gas chamber 48 preferably has a pressure release mechanism on the off chance that an explosion develops in the furnace. The off-gas chamber 48 also serves as a junction box if additional capacity is required at a later date. Referring to FIG. 1*c*, the partially cooled fume gases coming off the furnace are diverted 90 degrees to the remainder of the exhaust system 16. The length of the system is sufficient to cool the exhaust gases exiting a metallurgical furnace, such as EAF or BOF from 4,000° F.-5,000° F. to 200° F.-350° F. As shown in FIG. 1*d*, the complete cooling system outside the furnace is comprised of 8 pairs of manifolds after the off-gas chamber 48, plus 2 pairs prior to the off-gas chamber 48, and a smoke ring: Each pair of manifolds has 4 heat exchanger panels, bringing the total number to 40 panels, plus the smoke ring panel 66. The smoke ring can be mounted on the roof of the furnace, instead of to a duct, and a discussion of this configuration follows.

Figure 2:
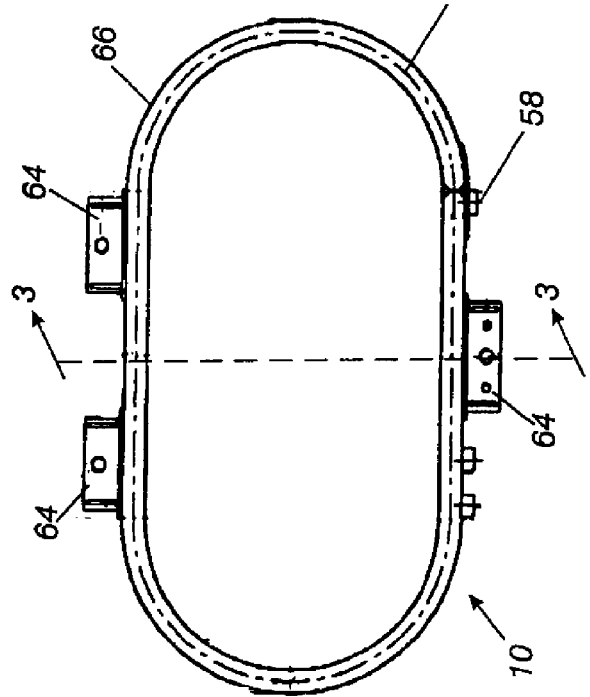
FIG. 2 is a planar view of the heat exchanger system configured as a smoke ring, where the smoke ring is comprised of sinuously winding piping that winds back and forth forming a curved panel that is an ellipsoidal ring. The ellipsoidal ring has one inlet and one outlet for the cooling water. Alternatively, the smoke ring can be configured to have more than one inlets and outlets.
Figure 3:
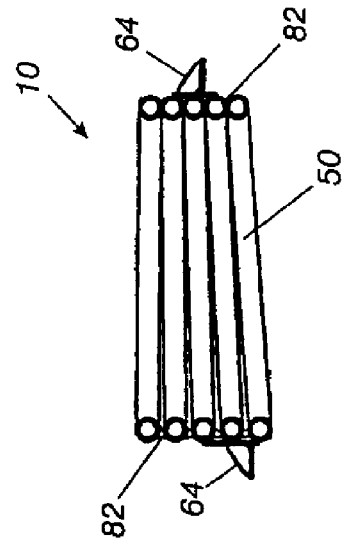
FIG. 3 is a cross-sectional view of the invention illustrated in FIG. 2 taken along sectional line 3-3.
Figure 4:
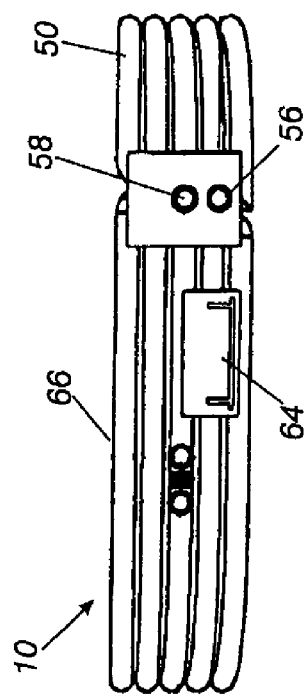
FIG. 4 is a side view of the heat exchanger system configured as a smoke ring illustrated in FIG. 2.

Referring to FIGS. 2-4, which further illustrate the heat exchanger system configured as a smoke ring, where the smoke ring 66 is comprised of sinuously winding piping that winds back and forth forming a curved panel that is an ellipsoidal ring. The ellipsoidal ring has one inlet and one outlet for the cooling water. Alternatively, the smoke ring can be configured to have more than one inlets and outlets. In the embodiment shown, the heat exchanger 10 has three smoke ring brackets 64 or mounting the heat exchanger to a domed furnace roof. The piping 50, as shown in FIG. 3, is more compressed on the right than on the left, and the bracket 64 on the left is lower on the left than on the right. The compression and the different placement of the bracket compensates for the pitch of the roof, which result in a profile that is substantially vertical. The linkages 82 establish not only the curvature of the panel of sinuously winding piping 50, but also the profile.

Figure 8:
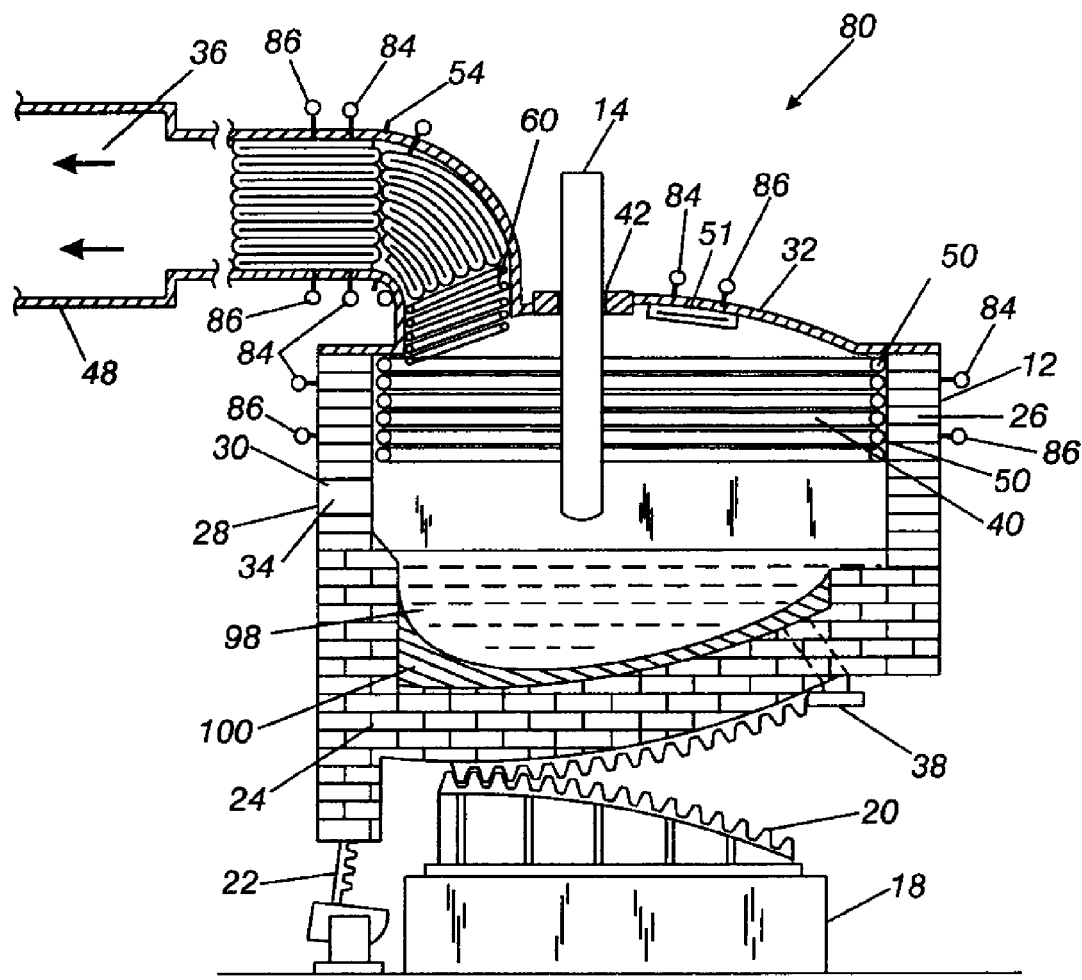
FIG. 8 is a cross-sectional view of a steel making furnace fitted with numerous components of the heat exchanger system. The system is used in the furnace as well as in the ducts to cool the exhaust gases.

Referring to FIG. 8, the illustrative furnace is shown as an EAF type furnace 80. It is to be understood that the EAF disclosed is for explanation only and that the invention can be readily applied in BOF type furnaces and the like. In FIG. 8, an EAF 80 includes a furnace shell 12, a plurality of electrodes 14, an exhaust system 16, a working platform 18, a rocker tilting mechanism 20, a tilt cylinder 22, and an off gas chamber b. The furnace shell 12 is movably disposed upon the rocker tilt 20 or other tilting mechanism. Further, the rocker tilt 20 is powered by tilt cylinder 22. The rocker tilt 20 is further secured upon the working platform 18.

The furnace shell 12 is comprised of a dished hearth 24, a generally cylindrical side wall 26, a spout 28, a spout door 30, and a general cylindrical circular roof 32. The spout 28 and spout door 30 are located on one side of the cylindrical side wall 26. In the open position, the spout 28 allows intruding air 34 to enter the hearth 24 and partially burn gases 36 produced from smelting. The hearth 24 is formed of suitable refractory material which is known in the art. At one end of the hearth 24 is a pouring box having a tap means 38 at its lower end. During a melting operation, the tap means 38 is closed by a refractory plug, or a slidable gate. Thereafter, the furnace shell 12 is tilted, the tap means 38 is unplugged, or open and molten metal is poured into a teeming ladle, tundish, or other device, as desired.

The inside wall 26 of the furnace shell 12 is fitted with water cooled panels 40 of sinuously winding piping 50. The panels, in effect serve as an interior wall in the furnace 80. The manifolds, which supply cool water and a return, are in fluid communication with the panels 40. Typically, the manifolds are positioned peripherally in a fashion similar to the illustrated exhaust ducts 44. The cross-section of the manifolds are shown outside the furnace shell 12 in FIG. 8. The heat exchanger system 10 produces a more efficient operation and prolongs the operation life of the EAF furnace 10. In a preferred embodiment, the panels 40 are assembled such that the sinuously winding piping has a generally horizontal orientation, comparable to the smoke ring illustrated in FIGS. 2-4. The piping 50 can be linked with a linkage 82, as shown in FIG. 7, or can have a base 92 that is mounted to the wall 94. Typically, with the latter configuration the piping has elongate ridges 96 for collecting slag and adding additional surface area to the piping. Alternatively, the panels 40 are mounted such that the sinuously winding piping 50 has a generally vertical orientation as shown in FIG. 5. The upper ends of the panels 40 define a circular rim at the upper margin of the side wall 26 portion of the furnace 80.

The heat exchanger system 10 can be fitted to the roof 32 of the furnace 80, wherein the water cooled panels 40 have a curvature that substantially follows the domed contour of the roof 32. The heat exchanger system 10, therein, is deployed on the inside of side wall 26 of the furnace 80, the roof 32 and the entrance of the exhaust system 16, as well as the throughout the exhaust system 16. Cumulatively, the heat exchanger system protects the furnace and cools the hot waste gases 36 as they are ducted to a bag house or other filtering and air treatment facilities, where dust is collected and the gases are vented to the atmosphere.

In operation, hot waste gases 36, dust and fumes are removed from the hearth 24 through vent 46 in the furnace shell 12. The vent 46 communicates with the exhaust system 16 comprised of the fume ducts 44, as shown in FIGS. 1 and 1a-1d.

Referring to FIG. 5, the panel 40 has multiple axially arranged pipes 50. U-shaped elbows 53 connect adjacent sectional lengths of piping or pipes 50 together to form a continuous piping system. Linkages 82 that additionally serve as spacers are between adjacent pipes 50, and they provide structural integrity of the panel 40 and are determinative of curvature to the panel 40.

FIG. 7 is a cross-sectional view of the panel embodiment of FIG. 5. A variation is illustrated in FIG. 6, wherein the pipes 50 have a tubular cross-section, a base 92, an elongate ridge 96, and a base plate 93. The base plate 93 is attached to the furnace wall 26, or to the furnace roof 32. The combination of the piping and, optionally, the base plate forms panel 40, which creates an interior wall of the furnace. The panels 40 cool the wall 26 of the furnace above the hearth in an EAF or the hood and fume ducts of a BOF.

The panels are water cooled, and are comprised of an aluminum bronze alloy that is custom melted and processed into a seamless pipe 50. The cooling ducts 44 are incorporated into the exhaust system 16. Moreover, the piping 50 is formed into the cooling panels 40 and placed throughout the roof 32 and ducts 44. The aluminum bronze alloy preferably has a nominal composition of: 6.5% Al, 2.5% Fe, 0.25% Sn, 0.5% max Other, and Cu equaling the balance. However, it will be appreciated that the composition may vary, so that the Al content is at least 5% and no more than 11% with the respective remainder comprising the bronze compound.

The use of the aluminum bronze alloy provides enhanced mechanical and physical properties over prior art devices (i.e., carbon or stainless steel cooling systems) in that the alloy provides superior thermal conductivity, hardness, and modulus of elasticity for the purposes of steel making in a furnace. By employing these enhancements, the operational life of the furnace is directly increased.

In addition to the superior heat transfer characteristics, the elongation capabilities of the alloy is greater than that of steel or stainless steel, thereby allowing the piping and duct work 44 to expand and contract without cracking. Further, the surface hardness is superior over the prior art in that it reduces the effects of erosion from the sand blasting effect of off-gas debris.

The process of forming the piping is preferably extrusion, however, one skilled in the art will appreciate that other forming techniques may be employed which yield the same result, i.e., a seamless component. During extrusion, the aluminum bronze alloy is hot worked, thereby resulting in a compact grain structure, which possesses improved physical properties.

In the pipes shown in FIG. 6, the elongate ridge 96 is a spline that is especially suitable for collecting slag. The mass on each side of the centerline of the tubular section is equivalent, so that the mass of the elongate ridge 96 is approximately equal to the mass of the base 92. By balancing the mass and employing extruded aluminum bronze alloys, the resulting pipe is substantially free of stress risers. The disclosed pipe has improved stress characteristics, and heat exchange panels fabricated with these pipes are less subject to damage caused by dramatic temperature changes, for instance, during the cycling of the furnace.

The composition of the heat exchanger system differs from the prior art in that piping and plates in the prior art were composed of carbon-steel or stainless steel, as opposed to the disclosed composition of aluminum bronze alloy. The composition of the aluminum bronze alloy is not as prone to acid attack. Furthermore, applicants' have determined that aluminum bronze has a higher heat transfer rate than both carbon-steel or stainless steel, and that the alloy possesses the capability to expand and contract without cracking. Finally, the surface hardness of the alloy is greater than that of either steel, thereby reducing the effects of eroding the surface from the sand blasting effects of the exhaust gas moving through the duct/cooling system.

ALTERNATIVE EMBODIMENT

Figure 9:
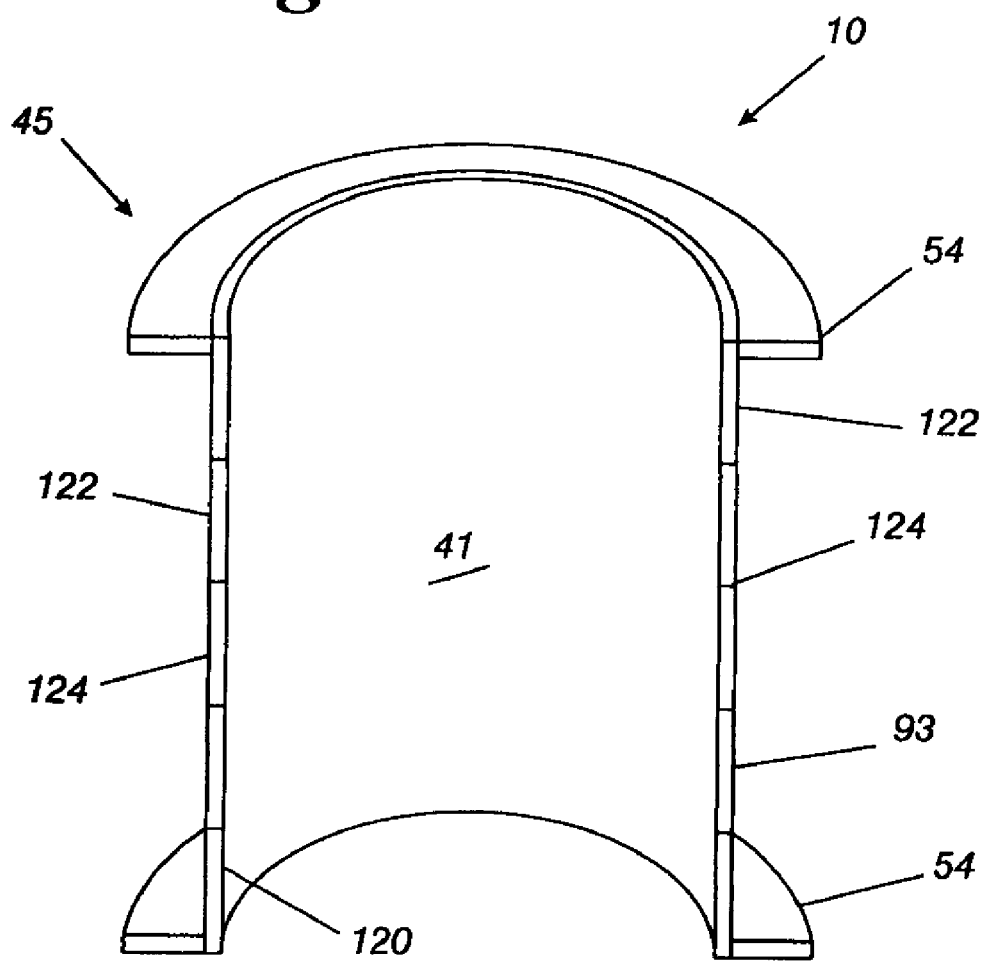
FIG. 9 is a cross-sectional view of a heat exchanger system that utilizes baffles, where the system provides cooling for a duct. The system has a channel created by the baffles, where the baffles direct the flow of the cooling fluid to flow in a serpentine fashion.

A similar flow of the cooling fluid through the heat exchanger system is achieved through the use of a sinuously winding channel. The channel 122 is formed by interspacing baffles 124 between a front plate 120 and the base plate 93. FIG. 9 illustrates an embodiment of the heat exchanger system 10 using baffles. In the illustrated embodiment, the heat exchanger system 10 is a duct 45, where the front plate 120 is on the interior of the duct 45. In the illustrated embodiment, the base plate 93 also functions as the exterior wall of the duct 45. The duct has flanges 54 for coupling one duct to another duct, or coupling to an air box 48, or coupling to the roof 32 of the furnace 80. In the illustrated embodiment the cooling fluid flows in and out of the plane of the paper. As illustrated, there is only one pane 141, and it is in fluid communication with an input manifold (not shown) and an output manifold (not shown). The manifolds are mounted to the exterior side of the base plate 93.

FIG. 10 illustrates the heat exchanger system 10 configured as an interior furnace wall 47, which is cooling pane 141. The interior furnace wall 47 is fabricated to follow the contour of the wall 26 of the furnace shell 12. The panel 41 has baffles 124 mounted between the front plate 120 and the base plate 93. The system has an inlet 56 and an outlet 58 for the cooling fluid. The manifolds, which supply cool water and a return, are in fluid communication with the panel 41. Although only one panel is shown, the application could be configured to have multiple panels. The front plate 120 and the baffles 124 have an aluminum bronze alloy composition. The baffles are welded to the front plate along longitudinal edge 126. The base plate is attached to the opposing longitudinal edge, therein forming the channel 122. The channel 122 can be seen on the left hand side corner of FIG. 10. Note, the flow of the cooling fluid is sinuously winding in a serpentine fashion, very similar to the flow through the assemblage of pipes mounted side-by-side, as shown in FIG. 5. The manifolds are not shown in embodiment 45 or 47, but are positioned peripherally, as previously illustrated in FIG. 2.

Referring to FIG. 11, which illustrates an interior furnace wall 49 cooled with a panel 43 having a plurality of spray nozzles 125. The heat exchanger has an aluminum bronze front plate 120, pipes 50 fitted with nozzles 125 and a base plate 93. The front plate 120 is directly exposed to the heat, exhaust gases, and slag produced by the steel making process.

The nozzles 50 spray the cooling fluid from the base plate toward the backside of the front plate 120.

Referring to FIG. 12, which is a cross-sectional view of an air box 48 that is cooled using a heat exchanger system that utilizes spray nozzles 125. The four aluminum bronze front plates 120 define the interior of the air box 48. The plurality of nozzles 125 on pipe 50, direct a pattern spray of cooling fluid to the back side of the front plate 120. The base plate 93 serves as a mount for the pipes 50 as well as an exterior wall for the air box 48. The front plate 120 is displaced sufficiently from the plurality of nozzles that the cooling fluid is sprayed in an overlapping pattern. The overlap is sufficient to cover an area, which reduces the number of serpentine windings necessary to cool the front plate. In the illustrated embodiment shown in FIG. 12 there is an assemblage of only two pipes shown, each with an inlet 56 and an outlet 58. Not shown could be many more pipes with nozzles. Reviewing FIG. 11, the pipes are connected with U shaped elbows 53, and similar connections can be used in the air box 48. As illustrated, there is only one panel 43 having at least one inlet and outlet.

Although particular embodiments of the invention have been described in detail, it will be understood that the invention is not limited correspondingly in scope, but includes all changes and modifications coming within the spirit and terms of the claims appended hereto. It should be obvious that the heat exchanger system, whether utilizing sinuously winding piping, baffles or spray nozzles and plates can be employed in extremely harsh environments to cool gases and condense many vaporized materials.

SUMMARY OF THE ACHIEVEMENT OF THE OBJECTS OF THE INVENTION

From the foregoing, it is readily apparent that we have invented an improved heat exchanger system constructed of aluminum bronze alloys, where aluminum bronze alloys have been found to have a higher than expected thermal conductivity, resistance to etching by the stream of hot gases, and good resistance to oxidation. Furthermore, we have provided a heat exchanger system wherein the operational life of the heat exchanger is extended, as corrosion, and erosion of the heat exchanger, and related components is reduced when they are fabricated with aluminum bronze alloy.

Additionally provided is a heat exchanger system that is adaptable for cooling exhaust gases emanating from a steel making furnace, wherein the heat exchanger system can be fitted to the walls of the furnace, a furnace roof, a smoke ring exhaust port, a straight section of an exhaust duct, and a curved section of an exhaust duct. The heat exchanger system cools the exhaust gases exiting a metallurgical furnace such as EAF or BOF from 4,000° F.-5,000° F. to 200° F.-350° F.

The invention provides a heat exchanger system that can be adapted for collecting and cooling slag, where the sinuously winding piping is extruded seamless piping having an elongate ridge, and the piping resists corrosion, erosion, pressure, and thermal stress.

Also provided is a heat exchanger that has other applications, such as cooling exhaust gases from converting plants, paper manufacturing plants, coal and gas fired electrical power generation plants, and other exhaust gas generators, where the gases are cooled for the purpose of capturing one or more components of the gas, where capture is effected by condensation, by carbon bed absorption, or by filtration.

It is to be understood that the foregoing description and specific embodiments are merely illustrative of the best mode of the invention and the principles thereof, and that various modifications and additions may be made to the apparatus by those skilled in the art, without departing from the spirit and scope of this invention.

What is claimed is:

1. A heat exchanger system, said system comprising:
   a furnace having means for heating an interior of the furnace and generating exhaust gases in the temperature range of about 4000° F. to 5000° F.;
   at least one heat exchange panel of piping having a plurality of spray nozzles, said piping mounted on a base plate offset from a front plate, wherein the at least one panel has an inlet and an outlet;
   an input manifold in fluid communication with the inlet of the at least one panel;
   an output manifold in fluid communication with the outlet of the at least one panel;
   the piping being configured to have a cooling fluid flowing through the piping and being sprayed through the nozzles;
   the piping being located to have the front plate define a portion of the interior of the furnace such that a stream of hot exhaust gases from the furnace flows over the front plate;
   wherein the spray nozzles direct and disperse the cooling fluid onto the backside of the front plate, thereby providing heat transfer from the front plate to the cooling fluid; and
   wherein the front plate is comprised of an aluminum bronze alloy.

2. The heat exchanger system, according to claim 1, wherein the at least one panel is mounted to an interior side of a wall, and is in fluid communication with the output and the input manifolds that are on an exterior side of the wall.

3. The heat exchanger system, according to claim 1, wherein the wall has curvature, as for instance does the wall of a steel making furnace, a furnace roof, a smoke ring exhaust port, a straight section of an exhaust duct, and a curved section of an exhaust duct, or the wall is straight as is commonly employed for air boxes.

4. The heat exchanger system, according to claim 1, wherein a plurality of the at least one panel are mounted around the interior side of an exhaust duct of the furnace, wherein each panel is individually supplied the cooling liquid from the output manifold which encircles the exterior side of the exhaust duct; and wherein each panel returns the cooling liquid to the output manifold which encircles the exterior side of the exhaust duct.

5. The heat exchanger system, according to claim 1, wherein the outlet is near the bottom of the at least one panel such that drainage is always toward the bottom so as to prevent a buildup of cooling fluid from obstructing the plurality of nozzles.

6. The heat exchanger system, according to claim 1, wherein a plurality of the at least one panel are mounted around the interior side of the furnace roof, wherein each panel is individually supplied the cooling liquid from the output manifold which is on an exterior side of the furnace roof; and wherein each panel returns the cooling liquid to the output manifold which is distributed over the exterior side of the furnace roof.

7. The heat exchanger system, according to claim 1, wherein a plurality of the at least one panel are mounted around the interior side of the furnace wall, wherein each panel is individually supplied the cooling liquid from the output manifold which encircles the exterior side of the furnace wall; and wherein each panel individually returns the cooling liquid to the output manifold which encircles the exterior side of the furnace wall.

8. The heat exchanger system, according to claim 3, wherein a plurality of the at least one panel are mounted around the interior side of the smoke ring exhaust port, wherein each panel is individually supplied the cooling liquid from the output manifold which encircles the exterior side of the smoke ring exhaust port; and wherein each panel returns the cooling liquid to the output manifold which encircles the exterior side of the smoke ring exhaust port.

9. The heat exchanger system, according to claim 1, wherein a plurality of exhaust ducts are strung together and the panels in the exhaust ducts and the smoke ring exhaust port lower the temperature of the stream of hot gases pulled from the furnace from about 4,000° F.-5,000° F. to about 200° F.-350° F.

10. The heat exchanger system, according to claim 1, wherein the aluminum bronze alloy comprises Cu, Al, Sn, and Fe.

11. The heat exchanger system, according to claim 1, wherein the furnace is one of an iron and steel manufacturing furnace, a converter, a paper manufacturing furnace, a coal and gas fired electrical power generation furnace, and other furnace that generate exhaust gases.

12. The heat exchanger system, according to claim 1, wherein said aluminum bronze alloy is extruded.

13. A heat exchanger system, said system comprising:
a furnace having means for heating an interior of the furnace and generating exhaust gases in the temperature range of about 4000° F. to 5000° F.;
at least one heat exchange panel of piping having a plurality of spray nozzles, said piping mounted on a base plate offset from a front plate, wherein the at least one panel has an inlet and an outlet;
an input manifold in fluid communication with the inlet of the at least one panel;
an output manifold in fluid communication with the outlet of the at least one panel;
the piping being configured to have a cooling fluid flowing through the piping and being sprayed through the nozzles;
the piping being located to have the front plate define a portion of the interior of the furnace such that a stream of hot exhaust gases from the furnace flows over the front plate;
wherein the spray nozzles direct and disperse the cooling fluid onto the backside of the front plate, thereby providing heat transfer from the front plate to the cooling fluid; and
wherein the front plate consists essentially of an aluminum bronze alloy.

* * * * *